US009226158B2

(12) United States Patent
Zhang

(10) Patent No.: US 9,226,158 B2
(45) Date of Patent: Dec. 29, 2015

(54) SECURITY OF USER PLANE TRAFFIC BETWEEN RELAY NODE AND RADIO ACCESS NETWORK

(75) Inventor: Shunliang Zhang, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 211 days.

(21) Appl. No.: 13/881,007

(22) PCT Filed: Oct. 29, 2010

(86) PCT No.: PCT/CN2010/078232
§ 371 (c)(1),
(2), (4) Date: Apr. 23, 2013

(87) PCT Pub. No.: WO2012/055114
PCT Pub. Date: May 3, 2012

(65) Prior Publication Data
US 2013/0210384 A1 Aug. 15, 2013

(51) Int. Cl.
*H04W 12/10* (2009.01)
*H04W 76/02* (2009.01)
*H04W 84/04* (2009.01)

(52) U.S. Cl.
CPC ............ *H04W 12/10* (2013.01); *H04W 76/022* (2013.01); *H04W 84/047* (2013.01)

(58) Field of Classification Search
CPC .. H04W 12/10; H04W 76/022; H04W 84/047
See application file for complete search history.

(56) References Cited

U.S. PATENT DOCUMENTS

| 2002/0036983 | A1* | 3/2002 | Widegren et al. | 370/230.1 |
| 2008/0076392 | A1* | 3/2008 | Khetawat et al. | 455/411 |

(Continued)

FOREIGN PATENT DOCUMENTS

| CN | 101001252 A | 7/2007 |
| CN | 101790168 A | 7/2010 |
| CN | 101860910 A | 10/2010 |
| WO | WO 2009/124234 A1 | 10/2009 |
| WO | WO 2010/061353 A1 | 6/2010 |

OTHER PUBLICATIONS

International Search Report and Written Opinion dated May 19, 2011 corresponding to International Patent Application No. PCT/CN2010/078232.

(Continued)

*Primary Examiner* — Kashif Siddiqui
(74) *Attorney, Agent, or Firm* — Squire Patton Boggs (US) LLP

(57) ABSTRACT

A gateway apparatus (40) for a user equipment (20) which is connected to a radio-access network via a relay node (10) determines that a dedicated bearer is to be created for a specific type of traffic which is to be transmitted on a data radio bearer to be created between the relay node (10) and a donor node (30) of the radio access network, and includes a parameter into a message requesting creation of the dedicated bearer, which indicates that the dedicated bearer is required for integrity protection or used to carry the specific type of traffic. The message is sent from the gateway apparatus (40) to a mobility management apparatus (50) which includes a second parameter in a message requesting setup of a radio access bearer for the type of traffic based on the parameter. The donor node (30) receives this message, recognizes from the second parameter that integrity protection is required for the data radio bearer, initiates a process to create the data radio bearer for the type of traffic requiring integrity protection, and initiates the integrity protection for the data radio bearer by including an indication that integrity protection is required for the data radio bearer in a connection reconfiguration message for initiating creation of the data radio bearer.

17 Claims, 2 Drawing Sheets

(56) References Cited

U.S. PATENT DOCUMENTS

| | | | |
|---|---|---|---|
| 2010/0120442 A1* | 5/2010 | Zhuang et al. | 455/450 |
| 2010/0265873 A1 | 10/2010 | Yi et al. | |
| 2010/0309837 A1* | 12/2010 | Yi et al. | 370/315 |
| 2014/0220934 A1* | 8/2014 | Zhang et al. | 455/410 |

OTHER PUBLICATIONS

S3-100896, Living Document on "Key Security Issues of Relay Node Architectures," 3GPP TSG-SA3 (Security), SA3#60, Jun./Jul. 28-2, 2010, Montreal Canada, vol. SA WG3.

SA3: "Living Document on Key Security Issues of Relay Node Architectures", vol. SASA3 (Security) WG3, no. Riga; Sep. 27, 2010, SA3#60bls, Sep. 27-29, 2010; Riga, Latvia Oct. 7, 2010, XP050459844, [retrieved on Oct. 7, 2010] p. 4 * * p. 3, paragraph 1 * p. 6, paragraph 3 * p. 11, paragraph 5. paragraph 5.3.

Huawei: "Comments to Security analysis of Relay Architectures", 3GPP Draft; S3-100229 Comments to S3-100190 vol. SA3 (Security) WG3, SA3#58,Feb. 1-5, 2010, Xi'an, China no. Xi'an, China; Feb. 1, 2010, XP050636176, [retrieved on Feb. 1, 2010] * p. 2, paragraph 3-p. 4, paragraph 4*.

European Search Report application No. 10858843.5 dated Oct. 21, 2014.

* cited by examiner

SECURITY OF USER PLANE TRAFFIC BETWEEN RELAY NODE AND RADIO ACCESS NETWORK

The present invention relates to security of user plane traffic between a relay node and a radio access network, and in particular to security of user plane traffic over an Un interface between the relay node (RN) and a DeNB (donor evolved node B).

Relaying is considered for LTE (long term evolution)— Advanced as a tool to improve e.g. coverage of high data rates, group mobility, temporary network deployment, cell-edge throughput and/or to provide coverage in new areas. In relaying, a user equipment or terminal (UE) is not directly connected with an access node such as a radio base station (e.g. denoted as eNodeB or eNB) of a radio access network (RAN), but via a relay node (RN). In the following, such user equipment may be referred to as relayed user equipment.

According to an assumption in 3GPP (third generation partnership project), the Un interface between the RN and DeNB is based on a standard E-UTRAN (evolved universal terrestrial radio access network) air interface Uu. Currently, a PDCP (packet data convergence protocol) layer of the interface Uu provides integrity and ciphering protection to control plane information carried by SRB (signalling radio bearer), such as RRC (radio resource control) and NAS (non access stratum) messages. Besides, the PDCP provides optional confidentiality for all user plane traffic between the RN and DeNB, but no integrity protection is provided to user plane traffic carried by DRB (data radio bearer).

Security protection by the PDCP layer of the interface Uu may be acceptable for user traffic from UE point of view, while this may not be acceptable for signalling traffic, e.g. S1AP (S1 application part) and X2AP (X2 application part), from RN to the radio access network. The S1AP is a control protocol on an S1 interface, i.e. between an eNB (evolved node B) and an MME (mobility management entity). The X2AP is used over an X2 interface, i.e. between eNBs.

This means that either the Un interface may have to be enhanced from a standard E-UTRAN UE-eNB interface, or some other method of protecting S1AP and X2AP signalling across the Un interface needs to be used. In case the security protection is provided by AS (access stratum) level, it is necessary to consider potential issues of the Un interface. As S1AP and X2AP is actual user plane traffic of the Un interface, S1AP/X2AP signalling messages should be carried by DRB instead of SRB.

The present invention aims at providing integrity protection to user plane traffic between a relay node and a radio access network, e.g. S1AP and X2AP signalling traffic carried by a data radio bearer.

This is achieved by the apparatuses and methods as defined in the appended claims. The present invention may also be implemented by a computer program product.

According to an embodiment of the invention, an integrity requirement indication or traffic type indication is used to inform a DeNB about which DRB is used to carry S1AP/X2AP before activating integrity protection. In more detail, upon a dedicated EPS bearer creation for S1AP/X2AP traffic, a S-GW/P-GW (serving gateway/PDN (packet data network) gateway) of an RN-UE (relay node user equipment) includes a parameter in a GTP-C (GPRS (General Packet Radio Service) tunnelling protocol control) message to an MME of the RN-UE to indicate that the EPS bearer is required for integrity protection or is used to carry a specific type of traffic (e.g. S1AP/X2AP traffic). The parameter is associated with the EPS bearer or TFT (traffic flow template) for S1AP/X2AP traffic of the RN-UE.

In the following the present invention will be described by way of embodiments thereof taking into account the accompanying drawings, in which.

Figure 1:
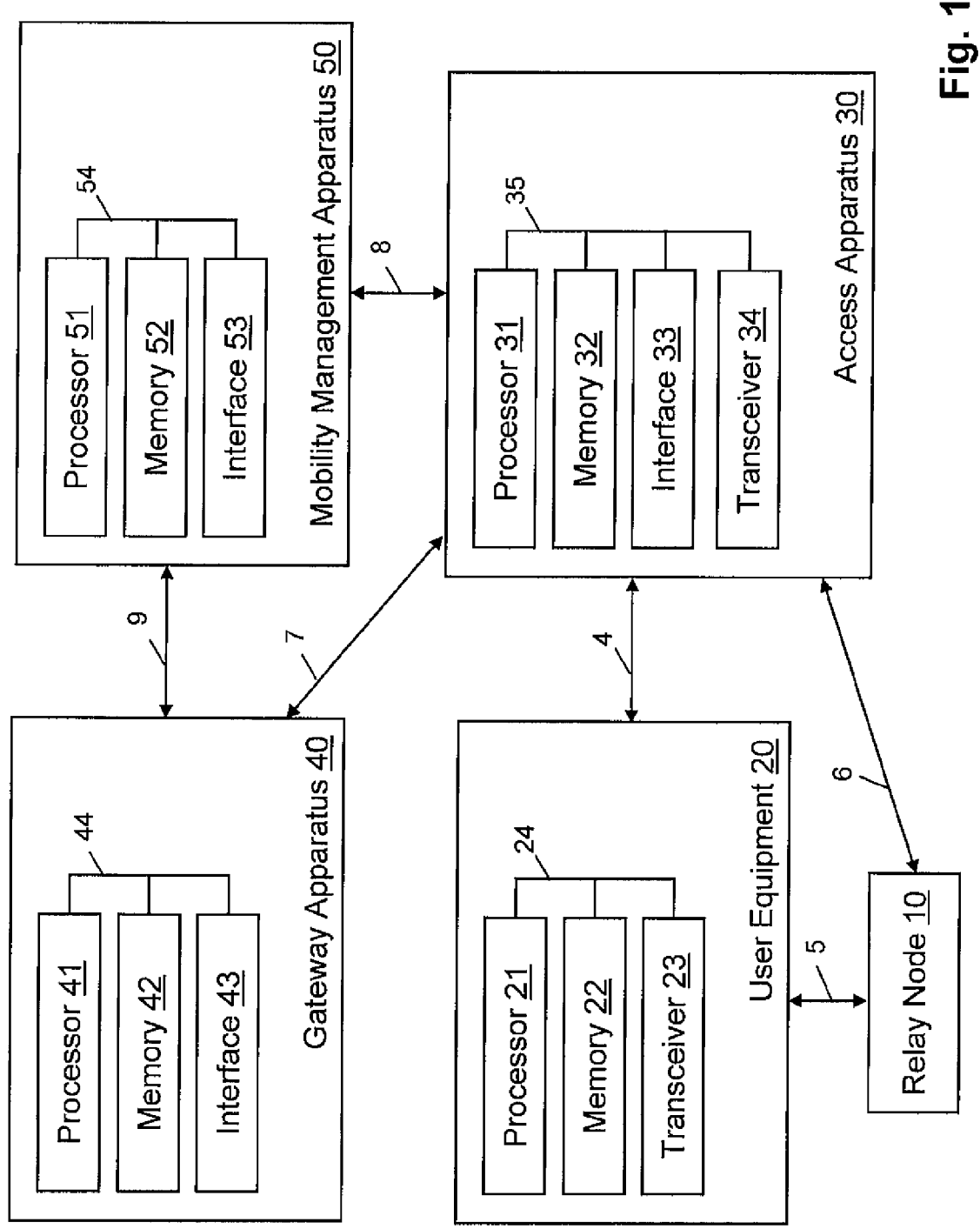
FIG. 1 shows a schematic block diagram illustrating structures of electronic devices according to an embodiment of the invention.

As a preliminary matter before exploring details of various implementations, reference is made to FIG. 1 for illustrating a simplified block diagram of various electronic devices that are suitable for use in practicing the exemplary embodiments of this invention.

A user equipment (UE) 20 includes a processor 21, a memory 22 that stores a program, and a suitable radio frequency (RF) transceiver 23 coupled to one or more antennas (not shown) for bidirectional wireless communications over one or more wireless links 4 with an access apparatus 30 such as a radio base station (e.g. denoted as eNodeB or eNB) of a radio access network (RAN). The processor 21, memory 22 and transceiver 23 are coupled by a bus 24.

In relaying, the user equipment 20 is not directly connected with the access apparatus 30, but via a relay node 10, with which the user equipment 20 communicates using one or more wireless links 5. The relay node 10 communicates with the access apparatus 30 via one or more wireless links 6. In relaying, according to an embodiment of the invention the access apparatus 30 may operate as DeNB (donor evolved node B).

The access apparatus 30 includes a processor 31, a memory 32 that stores a program, and a suitable radio frequency (RF) transceiver 34 coupled to one or more antennas (not shown) for bidirectional wireless communications over the one or more wireless links 4 with the user equipment 20 and for bidirectional wireless communications over the one or more wireless links 6 with the relay node 10. The access apparatus further includes an interface 33 for bidirectional communication with a gateway apparatus 40 via a link 7 and for bidirectional communication with a mobility management apparatus 50 via a link 8. The processor 31, memory 32, transceiver 34 and interface 33 are coupled by a bus 35.

The gateway apparatus 40 includes a processor 41, a memory 42 that stores a program, and an interface 43 for bidirectional communication with the access apparatus 30 via the link 7 and for bidirectional communication with a mobility management apparatus 50 via a link 9. The processor 41, memory 42 and interface 43 are coupled by a bus 44. In relaying, according to an embodiment of the invention the gateway apparatus 40 may operate as S-GW (serving gateway) or P-GW (PDN gateway) for the user equipment 20.

The mobility management apparatus 50 includes a processor 51, a memory 52 that stores a program, and an interface 53 for bidirectional communication with the access apparatus 30 via the link 8 and for bidirectional communication with the gateway apparatus 40 via the link 9. The processor 51, memory 52 and interface 53 are coupled by a bus 54. In relaying, according to an embodiment of the invention the mobility management entity 50 may operate as MME (mobility management entity) for the user equipment 20.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

At least one of the programs stored in the memories 22, 32, 42 and 52 is assumed to include program instructions that, when executed by the associated processor, enable the electronic device to operate in accordance with the exemplary embodiments of this invention, as detailed below.

In general, the exemplary embodiments of this invention may be implemented by computer software stored in the memories 22, 32, 42 and 52 and executable by the processors 21, 31, 41 and 51, or by hardware, or by a combination of software and/or firmware and hardware in any or all of the devices shown.

In general, the various embodiments of the user equipment 20 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The memories 22, 32, 42 and 52 may be of any type suitable to the local technical environment and may be implemented using any suitable data storage technology, such as semiconductor-based memory devices, magnetic memory devices and systems, optical memory devices and systems, fixed memory and removable memory. The processors 21, 31, 41 and 51 may be of any type suitable to the local technical environment, and may include one or more of general purpose computers, special purpose computers, microprocessors, digital signal processors (DSPs) and processors based on a multi-core processor architecture, as non-limiting examples.

Moreover, embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

In relaying, the user equipment (UE) 20 is connected to the access apparatus 30 operating as a so-called donor base station (DeNB) via the relay node (RN) 10. The link 6 between the DeNB 30 and the RN 10 may be referred to as Un interface, and the link 5 between the RN 10 and the UE 20 may be referred to as Uu interface.

In an effort to provide security to a DRB (data radio bearer) carrying specific type of traffic, e.g. S1-AP/X2-AP signalling traffic, over the Un interface, one problem is how does the DeNB 30 know which DRB would be used to carry the specific type of traffic before activating integrity protection. According to a mechanism of 3GPP, DRB creation on Un/Uu interface is based on E-RAB (evolved radio access bearer) creation command from the mobility management apparatus (MME) 50, which informs a list of RABs (radio access bearers) to be created and a requirement of each RAB, such as QoS (quality of service) information. Currently, no security related requirement is indicated from core network because the integrity protection is not necessary for each DRB.

Figure 2:
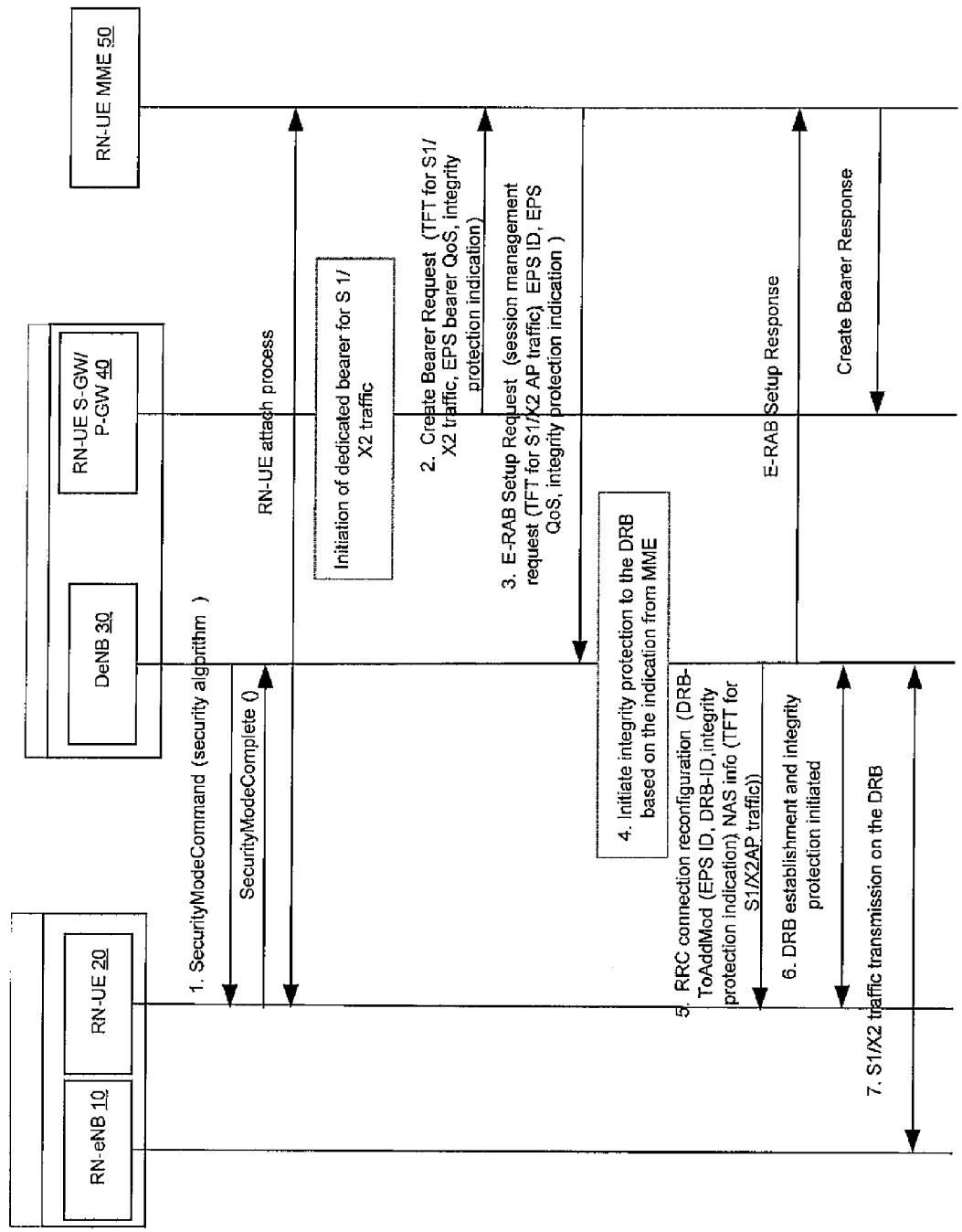
FIG. 2 shows a signalling diagram illustrating a process to enable security protection to user plane traffic on Un interface according to an embodiment of the invention.

The present invention proposes AS (access stratum) based solutions to the above security issue. FIG. 2 shows a signalling diagram illustrating a process to enable security protection to a specific type of traffic on the Un interface according to an implementation example of a first approach of the present invention.

FIG. 2 illustrates communications among an RN-eNB such as the relay node 10 of FIG. 1, RN-UE such as the user equipment 20 of FIG. 1, DeNB such as the assess apparatus 30 of FIG. 1, RN-UE S-GW/P-GW such as the gateway apparatus 40 of FIG. 1, and RN-UE MME such as the mobility management apparatus 50 of FIG. 1. The DeNB 30 which is part of a donor cell for the RN-eNB 10 provides wireless access to the RAN for the RN-eNB 10.

In a step 1. in FIG. 2, when an RRC connection is established between the RN-UE 20 and the DeNB 30, the DeNB 30 activates AS security by sending a security mode command message (message commanding security mode) to the RN-UE 20. Especially, the DeNB 30 may provide information to indicate a certain integrity protection algorithm used for a certain DRB carrying a specific type of traffic, e.g. S1AP/X2AP signalling traffic. It is to be noted that this AS security includes integrity protection to a certain DRB.

In other words, the DeNB 30 may provide information to indicate an integrity protection algorithm used for a certain data radio bearer (DRB) which may be created later on in the message commanding security mode to the RN-UE 20.

The RN-UE 20 responds with a message security mode complete. Then follows a process in which the RN-UE 20 attaches to the RN-UE MME 50 via the DeNB 30 and RN-UE S-GW/P-GW 40 (RN-UE attach process).

After the RN-UE 20 has attached to the RN-UE MME 50, the S-GW/P-GW of the RN-UE (the RN-UE S-GW/P-GW 40) initiates a dedicated bearer activation for S1AP/X2AP signalling traffic. For this purpose, the RN-UE S-GW/P-GW 40 sends a create bearer request message (GTP-C message) to the RN-MME 50 for requesting creation of an EPS (evolved packet system) bearer (step 2. in FIG. 2). The RN-UE S-GW/P-GW 40 includes a parameter "integrity protection indication" in the GTP-C message to indicate that the EPS bearer is required for integrity protection. This parameter is associated with the EPS bearer indicated by a TFT (traffic flow template) for S1AP/X2AP traffic of the RN-UE 20, which is also included in the GTP-C message in addition to the parameter and EPS bearer QoS.

In other words, the RN-UE S-GW/P-GW 40 determines that a dedicated bearer (EPS bearer) is to be created for a specific type of traffic which is to be transmitted on a data radio bearer to be created between the RN-eNB 10 and the DeNB 30, and includes a parameter into a message requesting creation of the dedicated bearer, wherein the parameter indicates that the dedicated bearer is required for integrity protection.

Upon reception of the EPS bearer creation message from the RN-UE S-GW/P-GW 40, the RN-UE MME 50 recognizes that the EPS bearer is required for integrity protection based on the parameter included in the EPS bearer creation message from the RN-UE S-GW/P-GW 40. The MME 50 of RN-UE includes a parameter (second parameter) "integrity protection indication" in a corresponding E-RAB setup request message (S1AP message) to the DeNB 30 (step 3. in FIG. 2) to indicate that a specific E-RAB associated with S1AP/X2AP is required for integrity protection. The E-RAB setup request message further indicates a session management request (TFT for S1AP/X2AP traffic), EPS bearer ID (identification) and EPS bearer QoS.

In other words, the RN-UE MME 50 receives a message requesting creation of a dedicated bearer (EPS bearer) for a type of traffic which is to be transmitted on a data radio bearer to be created between the RN-eNB 10 and the DeNB 30, wherein the message includes a parameter which indicates that the dedicated bearer is required for integrity protection, and includes a second parameter in a message requesting setup of a radio access bearer (E-RAB) for the type of traffic based on the parameter, wherein the second parameter indicates that the radio access bearer is required for integrity protection.

Based on the parameter included in the message from the MME 50 of RN-UE, the DeNB 30 recognizes that a DRB to be created is required for integrity protection, and initiates a related mechanism to provide the corresponding security protection to the DRB (step 4. in FIG. 2).

In particular, the DeNB 30 initiates creation of the DRB by sending an RRC connection reconfiguration message to the RN-UE 20 (step 5. in FIG. 2). Since the message received from the RN-UE MME 50 includes the parameter which indicates the requirement of the integrity protection to the DRB associated with the EPS bearer, the DeNB 30 informs the RN-UE 20 that integrity protection is required for the DRB by a parameter "integrity protection indication" associated with the DRB. The RRC connection reconfiguration message indicates DRB-ToAddMod (EPS ID, DRB-ID, integrity protection indication, NAS information (TFT for S1AP/X2AP traffic)).

In other words, the DeNB 30 receives a message requesting setup of a radio access bearer (E-RAB) for a type of traffic which is to be transmitted on a data radio bearer to be created between the RN-eNB 10 and the DeNB 30, wherein the message includes a parameter which indicates that the radio access bearer is required for integrity protection. The DeNB 30 recognizes from the parameter that integrity protection is required for the data radio bearer, initiates a process to create the data radio bearer for the type of traffic requiring integrity protection, and initiates the integrity protection for the data radio bearer by including an indication that integrity protection is required for the data radio bearer in a connection reconfiguration message for initiating creation of the data radio bearer. The DeNB 30 may initiate the integrity protection based on the integrity protection algorithm used for the data radio bearer, which may have been provided to the RN-UE in step 1. in FIG. 2, by indicating the integrity protection algorithm used for the data radio bearer in the connection reconfiguration message.

Based on the indication from the DeNB 30, the RN-UE 20 activates integrity protection for the DRB carrying S1AP/X2AP signalling traffic (step 6. in FIG. 2).

In other words, the RN-UE 20 receives a connection reconfiguration message including an indication that integrity protection is required for a data radio bearer to be created for a specific type of traffic between the RN-eNB 10 and the DeNB 30, and activates integrity protection for the data radio bearer. The RN-UE 20 may activate the integrity protection based on the integrity protection algorithm used for the data radio bearer, information on which may have been provided to the RN-UE in step 1. in FIG. 2, on the basis of the indication in the connection reconfiguration message, which indicates the integrity protection algorithm used for the data radio bearer.

A new value, e.g. 0x06, may be introduced for an algorithm type distinguisher IE to indicate the integrity protection algorithm for the integrity protection of the DRB. The MME 50 and the DeNB 30 may use the new value as part of an input to derive keys for the integrity protection algorithm for the DRB.

On the DRB created for S1AP/X2AP signalling traffic (step 7. in FIG. 2), the RN-eNB 10 exchanges S1AP/X2AP messages with the RN-UE MME 50 or neighbouring eNBs through the DeNB 30.

That is, to differentiate the S1AP and X2AP traffic with other user plane traffic, and provide integrity protection only to the concerned traffic, a certain DRB is introduced on the Un interface, and the certain DRB is dedicated to carry S1AP/X2AP traffic, and the integrity protection is provided to the DRB dedicated to S1AP/X2AP traffic.

In the following, an alternative approach will be described. According to this second approach, instead of the integrity requirement indication, a traffic type indication is added to the GTP-C message and E-RAB setup request message.

In particular, upon the dedicated EPS bearer creation for S1AP/X2AP traffic, the gateway apparatus (S-GW/P-GW) 40 of the user equipment (RN-UE) 20 includes a parameter in the GTP-C message to the mobility management apparatus (MME) 50 of the RN-UE 20 to indicate that the EPS bearer is used to carry a specific type of traffic, e.g. S1AP/X2AP traffic. The parameter is associated with the TFT for S1AP/X2AP traffic of the RN-UE 20.

In other words, the RN-UE S-GW/P-GW 40 determines that a dedicated bearer (EPS bearer) is to be created for a specific type of traffic which is to be transmitted on a data radio bearer to be created between the RN-UE 20 and the access apparatus (DeNB) 30, and includes a parameter into a message requesting creation of the dedicated bearer, wherein the parameter indicates that the dedicated bearer is used to carry the specific type of traffic.

The RN-UE MME 50 recognizes that the EPS bearer is to carry a specific type of traffic based on the parameter indicated in the message from the RN-UE S-GW/P-GW 40. The RN-UE MME 50 forwards the parameter to the DeNB 30 in a S1AP message (E-RAB setup request message) to indicate that the E-RAB is used to carry a specific type of traffic, e.g. S1AP/X2AP traffic.

In other words, the RN-UE MME 50 receives a message requesting creation of a dedicated bearer (EPS bearer) for a type of traffic which is to be transmitted on a data radio bearer to be created between the RN-eNB 10 and the DeNB 30, wherein the message includes a parameter which indicates that the type of traffic is specific type of traffic to be carried by the dedicated bearer, and includes a second parameter in a message requesting setup of a radio access bearer (E-RAB) for the type of traffic based on the parameter, wherein the second parameter indicates that the type of traffic is specific type of traffic to be carried by the radio access bearer. In the second approach, the second parameter corresponds to the parameter so that the parameter may be forwarded as the second parameter in the message requesting setup of the radio access bearer.

Based on the parameter included in the message from the RN-UE MME 50, the DeNB 30 recognizes that the DRB to be created is used to carry a specific traffic, e.g. S1AP/X2AP traffic, and initiates the related mechanism to provide the integrity protection to the DRB carrying the S1AP/X2AP traffic.

In other words, the DeNB 30 receives a message requesting setup of a radio access bearer for a type of traffic which is to be transmitted on a data radio bearer to be created between the RN-eNB 10 and the DeNB 30, wherein the message includes a parameter which indicates that the type of traffic is specific type of traffic to be carried by the radio access bearer. The DeNB 30 recognizes from the parameter that integrity protection is required for the data radio bearer, and initiates the integrity protection for the data radio bearer by including an indication that integrity protection is required for the data radio bearer in a connection reconfiguration message for initiating creation of the data radio bearer.

It is to be noted that the specific type of traffic is not limited to S1AP/X2AP traffic, but comprises other specific traffic required for integrity protection.

According to an aspect of the present invention, an apparatus such as the gateway apparatus 40 of FIG. 1 comprises determining means for determining that a dedicated bearer is to be created for a specific type of traffic which is to be transmitted on a data radio bearer to be created between a relay node, which is wirelessly connected to a radio-access network via a donor cell, and a donor node of the donor cell, and including means for including a parameter into a message requesting creation of the dedicated bearer, wherein the parameter indicates that the dedicated bearer is required for integrity protection or that the dedicated bearer is used to carry the specific type of traffic.

The determining means and the including means may comprise a processor or control unit which may use resources of one or more processors 41, one or more memories 42 and one or more interfaces 43 (respectively one shown in FIG. 1).

According to an aspect of the present invention, an apparatus such as the mobility management apparatus 50 shown in FIG. 1 comprises receiving means for receiving a message requesting creation of a dedicated bearer for a type of traffic which is to be transmitted on a data radio bearer to be created between a relay node, which is wirelessly connected to a radio-access network via a donor cell, and a donor node of the donor cell, wherein the message includes a parameter which indicates that the dedicated bearer is required for integrity protection or that the type of traffic is specific type of traffic to be carried by the dedicated bearer, and including means for including a second parameter in a message requesting setup of a radio access bearer for the type of traffic based on the parameter, wherein the second parameter indicates that the radio access bearer is required for integrity protection or that the type of traffic is specific type of traffic to be carried by the radio access bearer.

The second parameter may correspond to the parameter in case the parameter indicates the type of traffic is specific type of traffic to be carried by the dedicated bearer, and the apparatus may comprise forwarding means for forwarding the parameter as the second parameter in the message requesting setup of the radio access bearer for the type of traffic to indicate that the type of traffic is specific type of traffic to be carried by the radio access bearer.

The receiving means, the including means and the forwarding means may comprise a processor or control unit which may use resources of one or more processors 51, one or more memories 52 and one or more interfaces 53 (respectively one shown in FIG. 1).

According to an aspect of the invention, an apparatus such as the access apparatus 30 of FIG. 1 comprises receiving means for receiving a message requesting setup of a radio access bearer for a type of traffic which is to be transmitted on a data radio bearer to be created between a relay node, which is wirelessly connected to a radio-access network via a donor cell, and a donor node of the donor cell, wherein the apparatus comprises the donor node, wherein the message includes a parameter which indicates that the radio access bearer is required for integrity protection or that the type of traffic is specific type of traffic to be carried by the radio access bearer, recognizing means for recognizing from the parameter that integrity protection is required for the data radio bearer, first initiating means for initiating a process to create the data radio bearer for the type of traffic requiring integrity protection, and second initiating means for initiating the integrity protection for the data radio bearer by including an indication that integrity protection is required for the data radio bearer in a connection reconfiguration message for initiating creation of the data radio bearer.

The apparatus may further comprise providing means for providing information to indicate an integrity protection algorithm used for the data radio bearer in a message commanding security mode to a user equipment relayed by the relay node, wherein the second initiating means is configured to initiate the integrity protection based on the integrity protection algorithm used for the data radio bearer by indicating the integrity protection algorithm used for the data radio bearer in the connection reconfiguration message.

The receiving means, the recognizing means, the first and second initiating means and the providing means may comprise a processor or control unit which may use resources of one or more processors 31, one or more memories 32, one or more interfaces 33 and one or more transceiver 34 (respectively one shown in FIG. 1).

According to an aspect of the invention, a user equipment such as the user equipment 20 of FIG. 1 comprises receiving means for receiving a connection reconfiguration message including an indication that integrity protection is required for a data radio bearer to be created for a specific type of traffic between a relay node, which is wirelessly connected to a radio-access network via a donor cell, and a donor node of the donor cell, wherein the user equipment is relayed by the relay node, and activating means for activating integrity protection for the data radio bearer.

The receiving means may be configured to receive information to indicate an integrity protection algorithm used for the data radio bearer in a message commanding security mode, and the activating means may be configured to activate the integrity protection based on the integrity protection algorithm used for the data radio bearer on the basis of an indication in the connection reconfiguration message, which indicates the integrity protection algorithm used for the data radio bearer.

The receiving means and the activating means may comprise a processor or control unit which may use resources of one or more processors 21, one or more memories 22 and one or more transceivers 23 (respectively one shown in FIG. 1).

According to an aspect of the invention, a system comprises at least two of the above apparatuses and the user equipment.

According to an embodiment of the invention, a gateway apparatus 40 for a user equipment 20 which is connected to a radio-access network via a relay node 10 determines that a dedicated bearer is to be created for a specific type of traffic which is to be transmitted on a data radio bearer to be created between the relay node 10 and a donor node 30 of the radio access network, and includes a parameter into a message requesting creation of the dedicated bearer, which indicates that the dedicated bearer is required for integrity protection or used to carry the specific type of traffic. The message is sent from the gateway apparatus 40 to a mobility management apparatus 50 which includes a second parameter in a message requesting setup of a radio access bearer for the type of traffic based on the parameter. The donor node 30 receives this message, recognizes from the second parameter that integrity protection is required for the data radio bearer, initiates a process to create the data radio bearer for the type of traffic requiring integrity protection, and initiates the integrity protection for the data radio bearer by including an indication that integrity protection is required for the data radio bearer in a connection reconfiguration message for initiating creation of the data radio bearer, which the donor node 30 sends to the user equipment 20.

It is to be understood that the above description is illustrative of the invention and is not to be construed as limiting the invention. Various modifications and applications may occur to those skilled in the art without departing from the true spirit and scope of the invention as defined by the appended claims.

What is claimed is:

1. An apparatus comprising:
a processor configured to determine that a dedicated bearer is to be created for a specific type of traffic which is to be transmitted on a data radio bearer to be created between a relay node, which is wirelessly connected to a radio-access network via a donor cell, and a donor node of the donor cell, and to include a parameter into a message requesting creation of the dedicated bearer, wherein the parameter indicates that the dedicated bearer is required for integrity protection or that the dedicated bearer is used to carry the specific type of traffic.

2. An apparatus comprising:
a processor configured to receive a message requesting creation of a dedicated bearer for a type of traffic which is to be transmitted on a data radio bearer to be created between a relay node, which is wirelessly connected to a radio-access network via a donor cell, and a donor node of the donor cell, wherein the message includes a parameter which indicates that the dedicated bearer is required for integrity protection or that the type of traffic is specific type of traffic to be carried by the dedicated bearer, and to include a second parameter in a message requesting setup of a radio access bearer for the type of traffic based on the parameter, wherein the second parameter indicates that the radio access bearer is required for integrity protection or that the type of traffic is specific type of traffic to be carried by the radio access bearer.

3. The apparatus of claim 2, wherein the second parameter corresponds to the parameter in case the parameter indicates the type of traffic is specific type of traffic to be carried by the dedicated bearer, and the processor is configured to forward the parameter as the second parameter in the message requesting setup of the radio access bearer for the type of traffic to indicate that the type of traffic is specific type of traffic to be carried by the radio access bearer.

4. An apparatus comprising:
a processor configured to
receive a message requesting setup of a radio access bearer for a type of traffic which is to be transmitted on a data radio bearer to be created between a relay node, which is wirelessly connected to a radio-access network via a donor cell, and a donor node of the donor cell, wherein the apparatus comprises the donor node, wherein the message includes a parameter which indicates that the radio access bearer is required for integrity protection or that the type of traffic is specific type of traffic to be carried by the radio access bearer,
recognize from the parameter that integrity protection is required for the data radio bearer, and
initiate a process to create the data radio bearer for the type of traffic requiring integrity protection, and
initiate the integrity protection for the data radio bearer by including an indication that integrity protection is required for the data radio bearer in a connection reconfiguration message for initiating creation of the data radio bearer.

5. The apparatus of claim 4, wherein the processor is further configured to provide information to indicate an integrity protection algorithm used for the data radio bearer in a message commanding security mode to a user equipment relayed by the relay node, and to initiate the integrity protection based on the integrity protection algorithm used for the data radio bearer by indicating the integrity protection algorithm used for the data radio bearer in the connection reconfiguration message.

6. A user equipment comprising:
a processor configured to receive a connection reconfiguration message including an indication that integrity protection is required for a data radio bearer to be created for a specific type of traffic between a relay node, which is wirelessly connected to a radio-access network via a donor cell, and a donor node of the donor cell, wherein the user equipment is relayed by the relay node, and to activate integrity protection for the data radio bearer.

7. The user equipment according to claim 6, wherein the processor is further configured to receive information to indicate an integrity protection algorithm used for the data radio bearer in a message commanding security mode, and to activate the integrity protection based on the integrity protection algorithm used for the data radio bearer on the basis of an indication in the connection reconfiguration message, which indicates the integrity protection algorithm used for the data radio bearer.

8. The apparatus according to claim 1, wherein the specific type of traffic comprises S1AP and X2AP signalling traffic.

9. A method comprising:
determining that a dedicated bearer is to be created for a specific type of traffic which is to be transmitted on a data radio bearer to be created between a relay node, which is wirelessly connected to a radio-access network via a donor cell, and a donor node of the donor cell; and
including a parameter into a message requesting creation of the dedicated bearer, wherein the parameter indicates that the dedicated bearer is required for integrity protection or that the dedicated bearer is used to carry the specific type of traffic.

10. A method comprising:
receiving a message requesting creation of a dedicated bearer for a type of traffic which is to be transmitted on a data radio bearer to be created between a relay node, which is wirelessly connected to a radio-access network via a donor cell, and a donor node of the donor cell, wherein the message includes a parameter which indicates that the dedicated bearer is required for integrity protection or that the type of traffic is specific type of traffic to be carried by the dedicated bearer; and
including a second parameter in a message requesting setup of a radio access bearer for the type of traffic based on the parameter, wherein the second parameter indicates that the radio access bearer is required for integrity protection or that the type of traffic is specific type of traffic to be carried by the radio access bearer.

11. The method of claim 10, wherein the second parameter corresponds to the parameter in case the parameter indicates the type of traffic is specific type of traffic to be carried by the dedicated bearer, and the method comprises:
forwarding the parameter as the second parameter in the message requesting setup of the radio access bearer for the type of traffic to indicate that the type of traffic is specific type of traffic to be carried by the radio access bearer.

12. A method for an apparatus, the method comprising:
receiving a message requesting setup of a radio access bearer for a type of traffic which is to be transmitted on a data radio bearer to be created between a relay node, which is wirelessly connected to a radio-access network via a donor cell, and a donor node of the donor cell, wherein the apparatus comprises the donor node, wherein the message includes a parameter which indicates that the radio access bearer is required for integrity protection or that the type of traffic is specific type of traffic to be carried by the radio access bearer;
recognizing from the parameter that integrity protection is required for the data radio bearer;
initiating a process to create the data radio bearer for the type of traffic requiring integrity protection; and
initiating the integrity protection for the data radio bearer by including an indication that integrity protection is required for the data radio bearer in a connection reconfiguration message for initiating creation of the data radio bearer.

13. The method of claim 12, comprising:
providing information to indicate an integrity protection algorithm used for the data radio bearer in a message commanding security mode to a user equipment relayed by the relay node; and
initiating the integrity protection based on the integrity protection algorithm used for the data radio bearer by indicating the integrity protection algorithm used for the data radio bearer in the connection reconfiguration message.

14. A method for a user equipment, the method comprising:
receiving a connection reconfiguration message including an indication that integrity protection is required for a data radio bearer to be created for a specific type of traffic between a relay node, which is wirelessly connected to a radio-access network via a donor cell, and a donor node of the donor cell, wherein the user equipment is relayed by the relay node; and
activating integrity protection for the data radio bearer.

15. The method of claim 14, comprising:
receiving information to indicate an integrity protection algorithm used for the data radio bearer in a message commanding security mode; and
activating the integrity protection based on the integrity protection algorithm used for the data radio bearer on the basis of an indication in the connection reconfiguration message, which indicates the integrity protection algorithm used for the data radio bearer.

16. A computer program product embodied on a non-transitory computer-readable medium, comprising software code portions for controlling a processing device to perform the steps of claim 9 when the program is run on the processing device.

17. The computer program product according to claim 16, wherein the program is directly loadable into an internal memory of the processing device.

* * * * *